(12) United States Patent
Wong

(10) Patent No.: US 7,433,148 B2
(45) Date of Patent: Oct. 7, 2008

(54) HARD DISK DRIVE REPEATABLE RUNOUT FEED FORWARD CANCELLATION WITH HIGH SPEED AND LOW POWER PHASE ROTATOR

(75) Inventor: Richard Koonwai Wong, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/695,135

(22) Filed: Apr. 2, 2007

(65) Prior Publication Data

US 2007/0230024 A1 Oct. 4, 2007

Related U.S. Application Data

(60) Provisional application No. 60/788,270, filed on Mar. 31, 2006.

(51) Int. Cl.
*G11B 5/596* (2006.01)
(52) U.S. Cl. .................................... 360/77.04
(58) Field of Classification Search ............ 360/77.04, 360/77.02, 75, 77.05, 78.04, 78.09; 369/53.14, 369/44.29
See application file for complete search history.

(56) References Cited

U.S. PATENT DOCUMENTS

| 6,847,502 B1* | 1/2005 | Codilian | 360/77.04 |
| 6,992,853 B2* | 1/2006 | Chang | 360/77.02 |
| 7,088,547 B1* | 8/2006 | Wang et al. | 360/77.04 |
| 7,265,933 B1* | 9/2007 | Phan et al. | 360/77.04 |
| 7,333,410 B2* | 2/2008 | Serrano | 369/53.14 |
| 2007/0133364 A1* | 6/2007 | Serrano et al. | 369/44.29 |
| 2008/0112073 A1* | 5/2008 | Shelton | 360/77.04 |

* cited by examiner

*Primary Examiner*—Fred Tzeng
(74) *Attorney, Agent, or Firm*—Garlick Harrison & Markison; Robert A. McLauchian, III

(57) ABSTRACT

Embodiments of the present invention significantly reduce the number and complexity of processing operations to be performed. This is done by receiving the learned run out or vector A to be rotated by phase q. This phase q may be limited to a $\pi/4$ resolution. Sine function values and cosine function values based on q are selected from a group of values comprising $-1$, 0, and $+1$. The sine function values and cosine function values selected may then be applied to the learned run out or vector A to rotate the vector A by phase q. Because the sine and cosine values are limited to $-1$, 0 and $+1$ many multiplication processing operations are eliminated. This greatly simplifies the processing requirements associated with phase rotating of this learned run out.

21 Claims, 25 Drawing Sheets

PES: Position Error Signal
U: Control Effort

HARD DISK DRIVE REPEATABLE RUNOUT FEED FORWARD CANCELLATION WITH HIGH SPEED AND LOW POWER PHASE ROTATOR

CROSS REFERENCE TO RELATED APPLICATIONS

The present U.S. Utility Patent Application claims priority pursuant to 35U.S.C. § 119(e) to the following U.S. Provisional Patent Application which is hereby incorporated herein by reference in its entirety and made part of the present U.S. Utility Patent Application for all purposes:

1. U.S. Provisional Application Ser. No. 60/788,270, entitled "HARD DISK DRIVE REPEATABLE RUNOUT FEED FORWARD CANCELLATION WITH HIGH SPEED AND LOW POWER PHASE ROTATOR," filed Mar. 31, 2006.

TECHNICAL FIELD OF THE INVENTION

The present invention relates generally to hard disk drives.

BACKGROUND OF THE INVENTION

The structure and operation of hard disk drives is generally known. Hard disk drives include, generally, a case, a hard disk having magnetically alterable properties, and a read/write mechanism including Read/Write (RW) heads operable to write data to the hard disk by locally alerting the magnetic properties of the hard disk and to read data from the hard disk by reading local magnetic properties of the hard disk. The hard disk may include multiple platters, each platter being a planar disk.

All information stored on the hard disk is recorded in tracks, which are concentric circles organized on the surface of the platters. FIG. 1 depicts a pattern of radially-spaced concentric data tracks 12 within a disk 10. Data stored on the disks may be accessed by moving RW heads radially as driven by a head actuator to the radial location of the track containing the data. The track-based organization of data on the hard disk(s) allows for easy access to any part of the disk, which is why hard disk drives are called "random access" storage devices.

Since each track typically holds many thousands of bytes of data, the tracks are further divided into smaller units called sectors. This reduces the amount of space wasted by small files. Each sector holds 512 bytes of user data, plus as many as a few dozen additional bytes used for internal drive control and for error detection and correction.

Typically, these tracks and sectors are created during the low level formatting of the disk. This low level formatting process creates the physical structures (tracks, sectors, control information) on the disk. Normally, this step begins with the hard disk platters containing no information. Newer disks use many complex internal structures, including zoned bit recording to put more sectors on the outer tracks than the inner ones, and embedded servo data to control the head actuator. Newer disks also transparently map out bad sectors. Due to this complexity, all modern hard disks are low-level formatted at the factory for the life of the drive.

This low level formatting is usually performed using external servo writers that write the physical structures to disk 10 during manufacturing. Accurate positioning of the physical structures is achieved within the external servo writer by accurately controlling the RW head position within the external servo writer. External servo writers, because of the high degree of positioning accuracy required, have become an expensive processing bottleneck during the hard disk drive manufacturing.

Self servo writing (SSW) first has a servo-writer move the head at constant speed to write spirals from Inner Diameter (ID) to Outer Diamond (OD). The spirals are repeating patterns of sine wave bursts and spiral sync marks (SSM). The bursts are used to derive Position Error Signal (PES). The sync marks are used to derive timing to drive a Disk Lock Clock (DLC) system so that when it has locked, spirals are read and final servo patterns are written synchronously. Traditionally, servo-writer will write a certain number of tracks called seed wedges either in ID or OD so that track number and wedge number are established during startup.

Firmware or algorithms implemented by hardware then may keep track of track number and wedge number as the head is positioned. The position of the RW heads may drift from their targeted position. As the speed of rotation (RPM) and the TPI of HDD's increase, the need to increase the frequency of the applied cancellation is required to be addressed. Prior art RRO Feed-Forward cancellation system often become unstable when working at high frequency.

Further limitations and disadvantages of conventional and traditional SSW processes and related functionality will become apparent to one of ordinary skill in the art through comparison with the present invention described herein.

SUMMARY OF THE INVENTION

Embodiments of the present invention are directed to systems and methods that are further described in the following description and claims. Advantages and features of embodiments of the present invention may become apparent from the description, accompanying drawings and claims.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGs., like numerals being used to refer to like and corresponding parts of the various drawings.

Feed-Forward cancellation has been used to cancel Hard Disk Drive (HDD) Repeat Run-Out (RRO) where it is not necessary to rotate the phase of the learned Position Error Signal (PES). As the speed of rotation (RPM) and the TPI of HDD's increase, the need to increase the frequency of the applied cancellation is required to be addressed. Embodiments of the present invention substantially address this need as well as others. For example, current HDD may be required to cancel HDD RRO at eight times or more of the spindle motor running frequency.

Embodiments of the present invention provide a RRO Feed-Forward cancellation system working at high frequency. These embodiments may include a phase rotator into the Feed-Forward cancellation algorithm or into the Feed-Forward cancellation Hardware in order to maintain the stability of the servo system. As this phase rotator may require significant operations (i.e. many multiply and summing operations when implemented using techniques such as those provided by equation (1) as follows:

$$A*B = *M*1.0*e^{j(p+q)}$$
$$= M*[\cos(p+q) + j*\sin(p+q)]$$
$$= M*\{[\cos(p)\cos(q) - \sin(p)\sin(q)] + j*[\sin(p)\cos(q) + \cos(p)\sin(q)]\}$$

Embodiments of the present invention provide means to implement this phase rotator while reducing the required number of operations. This may be accomplished using techniques such as those provided by equation (2A) and (2B) as follows:

$$\Rightarrow \text{Real}(A*B) = M*[\alpha*\cos(p) - \beta*\sin(p)]$$
$$\Rightarrow \text{Imag}(A*B) = M[\alpha*\cos(p) + *\beta*\sin(p)]$$

This technique may further reduce micro-processor execution time when implemented within Firmware or by Hardware. Therefore, Embodiments of the present invention may reduce the cost and or the power consumption of the system.

A phase rotator to maintain the stability of the system may be included. In one embodiment, this phase rotator allows selection of one of eight phases to perform the phase rotation. These phases may include 0, 45, 90, 135, 180, 225, 270, or 315 degrees. Prior technology does not support the RRO cancellation on high spindle frequency because the servo system goes unstable as Feed-Forward applying control effort to correct the high spindle frequency run-out. Embodiments of the present invention include a phase rotator to maintain the stability of the system. This invention allows system designer to select one of the eight phases to do phase rotation. It's 0, 45, 90, 135, 180, 225, 270, or 315 degree.

Figure 1:
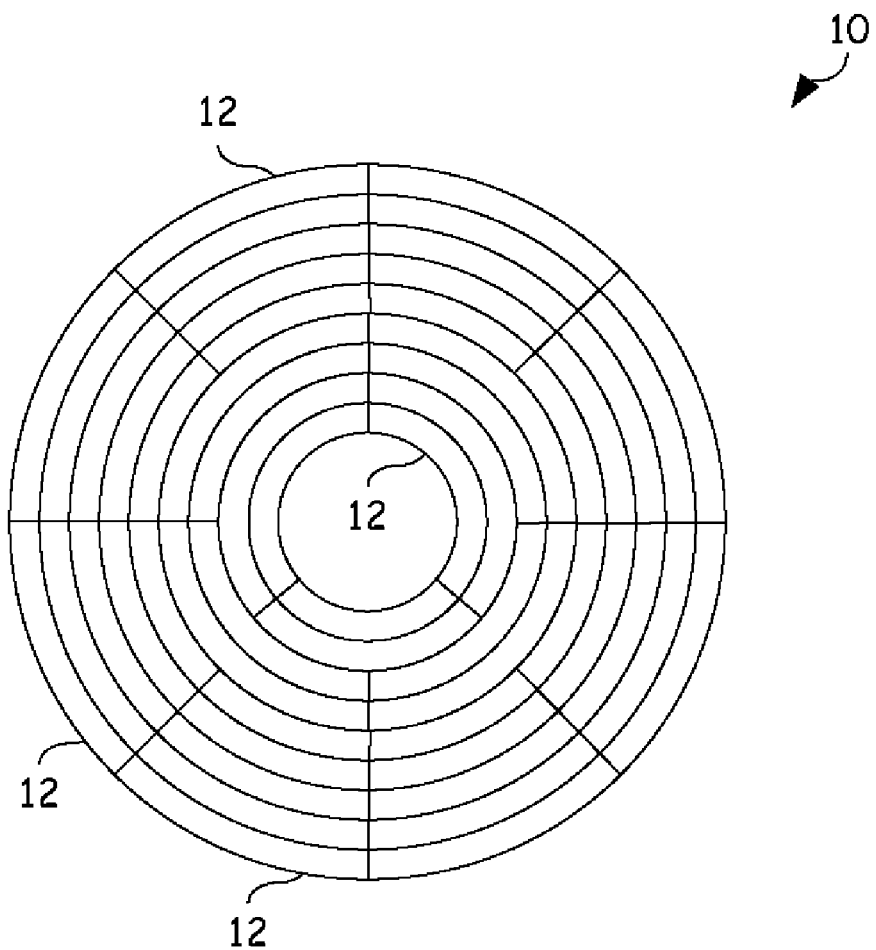
FIG. 1 depicts a pattern of radially-spaced concentric data tracks within the magnetic media of a disk.
Figure 2:
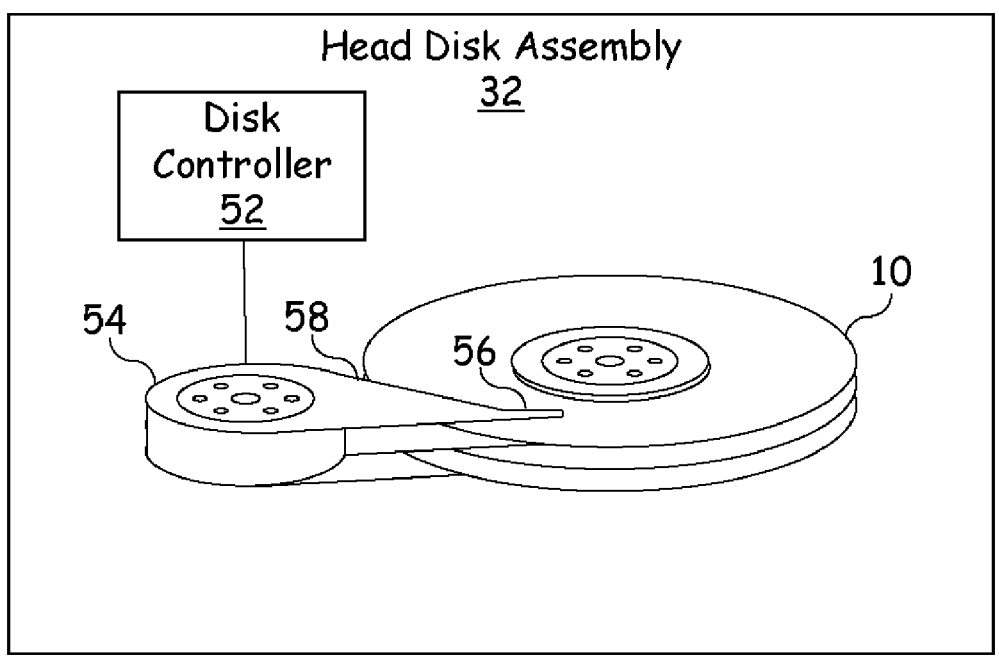
FIG. 2 depicts a hard disk drive that includes a control circuitry, a hard disk, an actuator, a RW head and positioning arm in accordance with an embodiment of the present invention.
Figure 3:
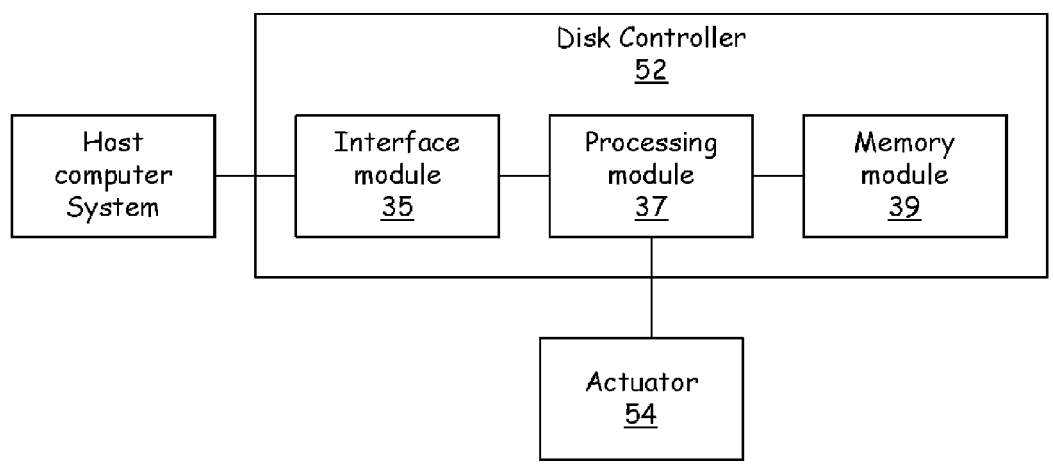
FIG. 3 is a functional block diagram of a disk controller in accordance with an embodiment of the present invention.

FIG. 2 depicts a hard disk drive 50 that includes disk controller 52, hard disk (magnetic media) 10, actuator 54, RW head 56 and positioning arm 58. Disk controller 52 as shown in FIG. 3 includes an interface module 61, processing module 63 and memory module 65. Disk Controller 52, which may be implemented as an integrated circuit or series of discrete components, may interface with a host computer system and direct the operation of the other internal components within hard disk drive 50.

Figure 10:
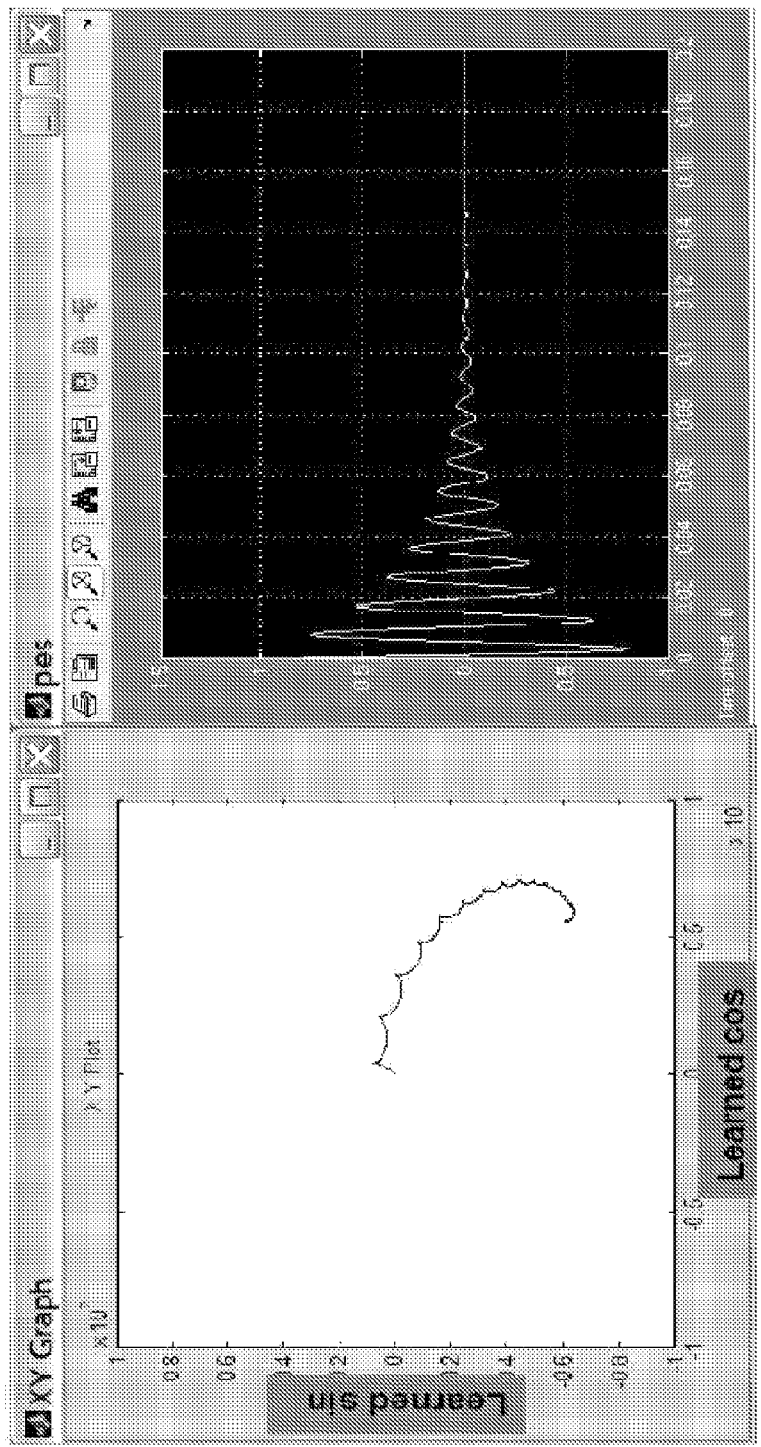
Figure 11:
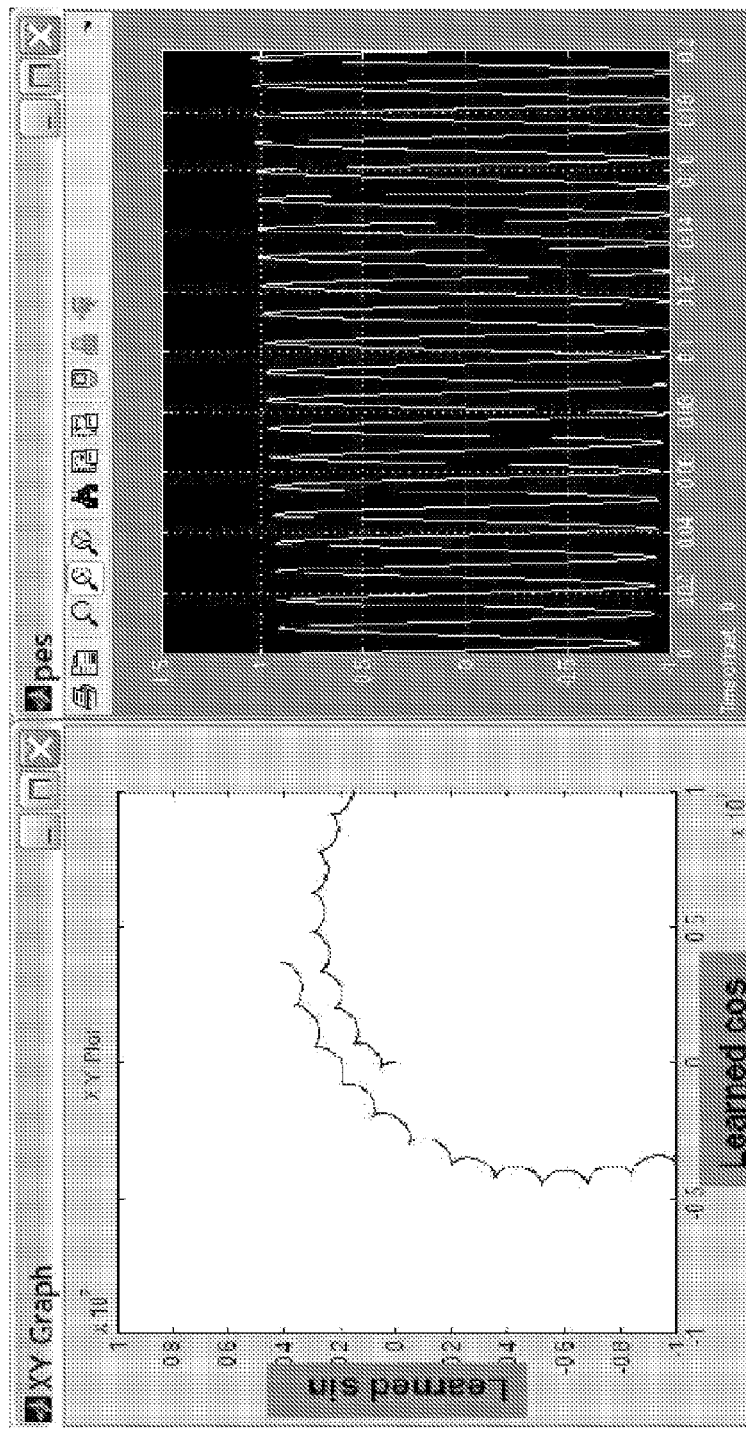
Figure 12:
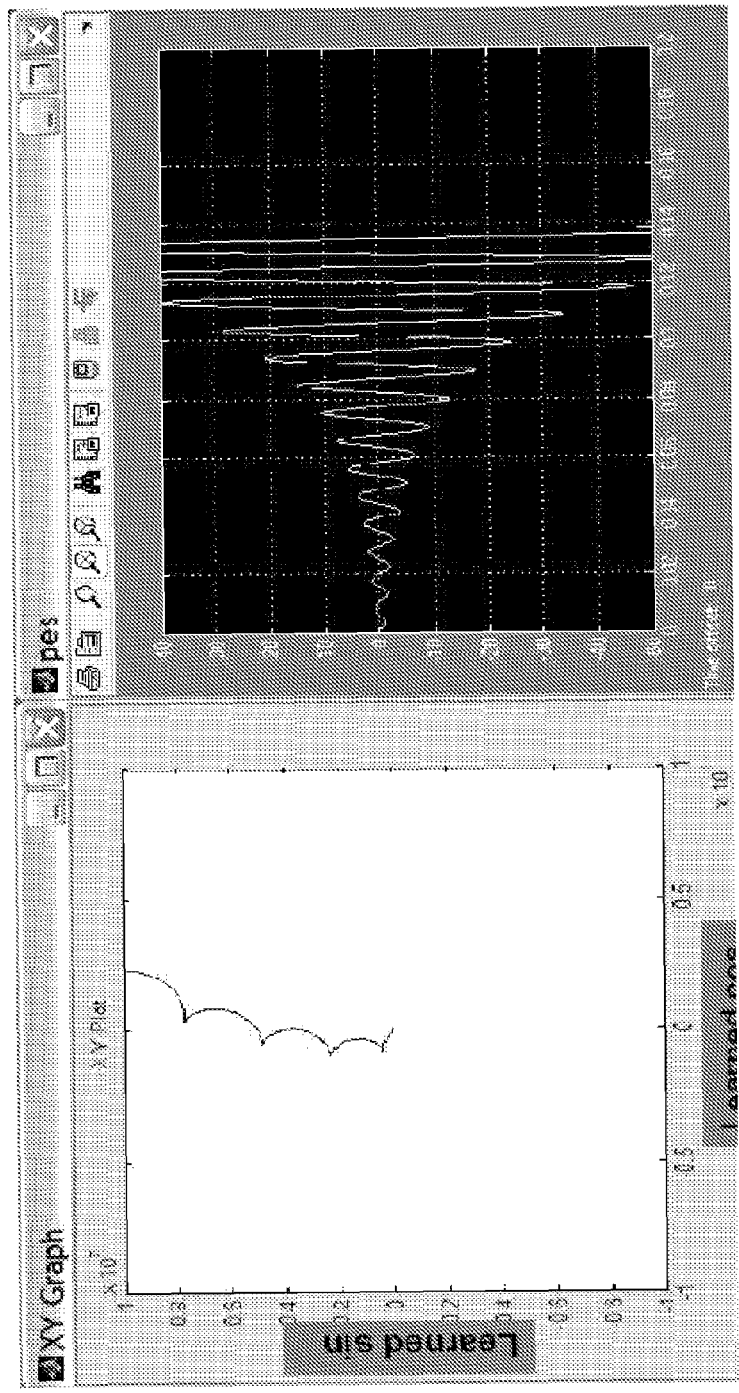
Figure 13:
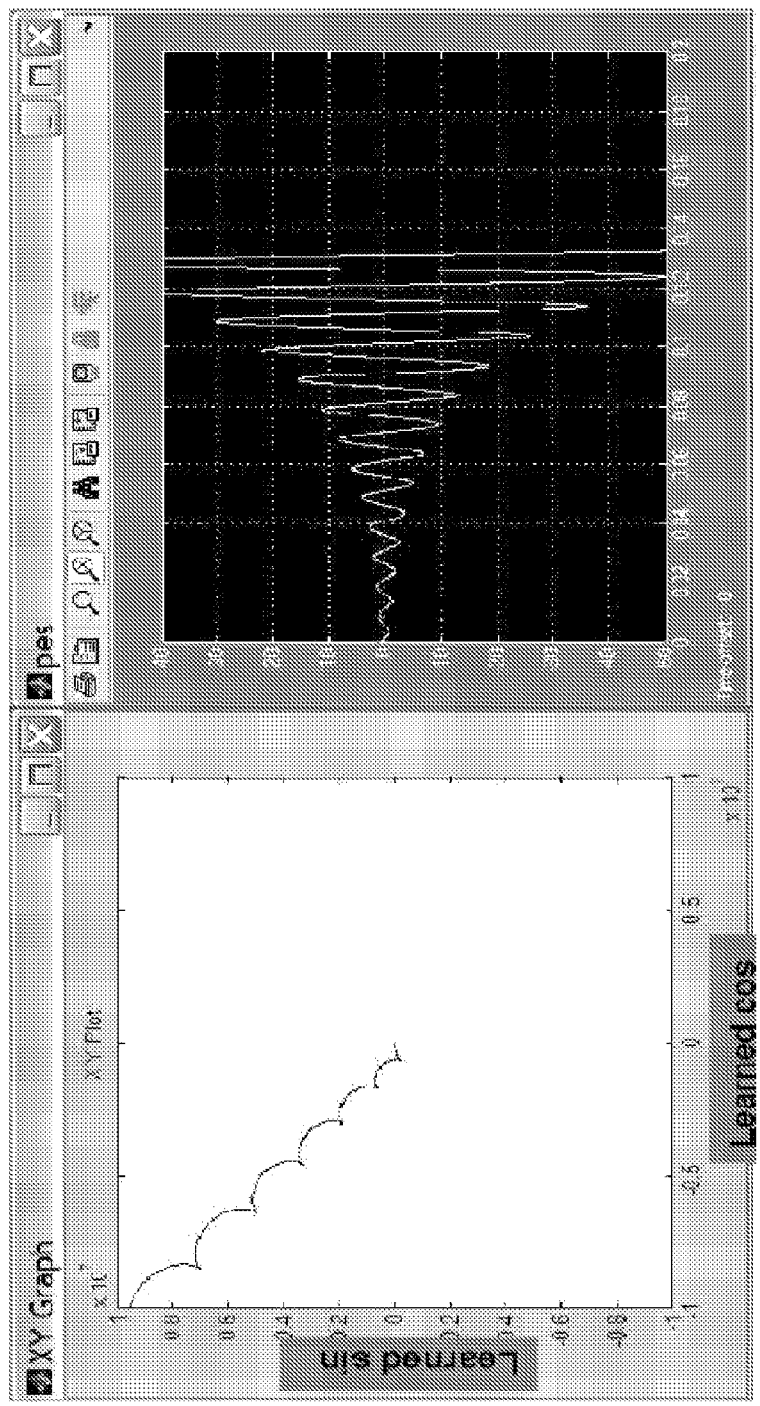
Figure 14:
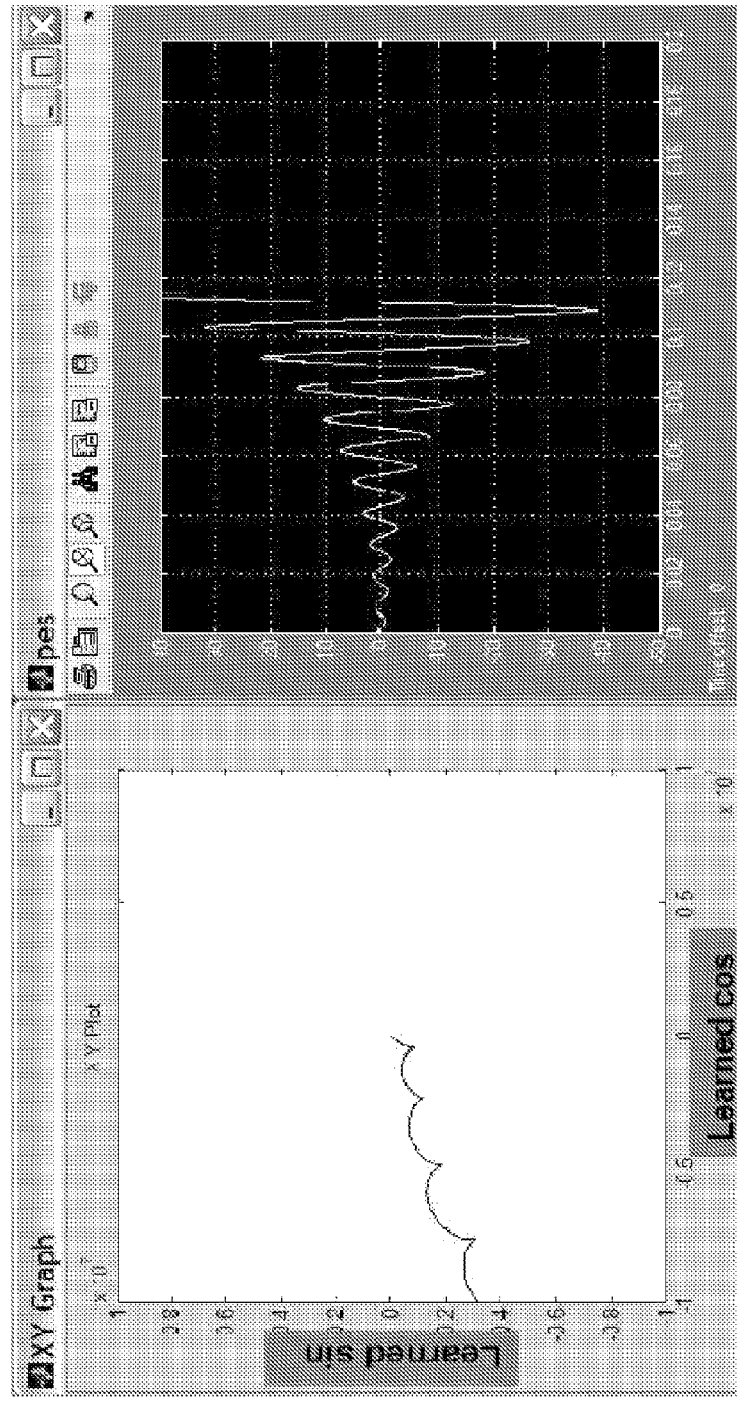
Figure 15:
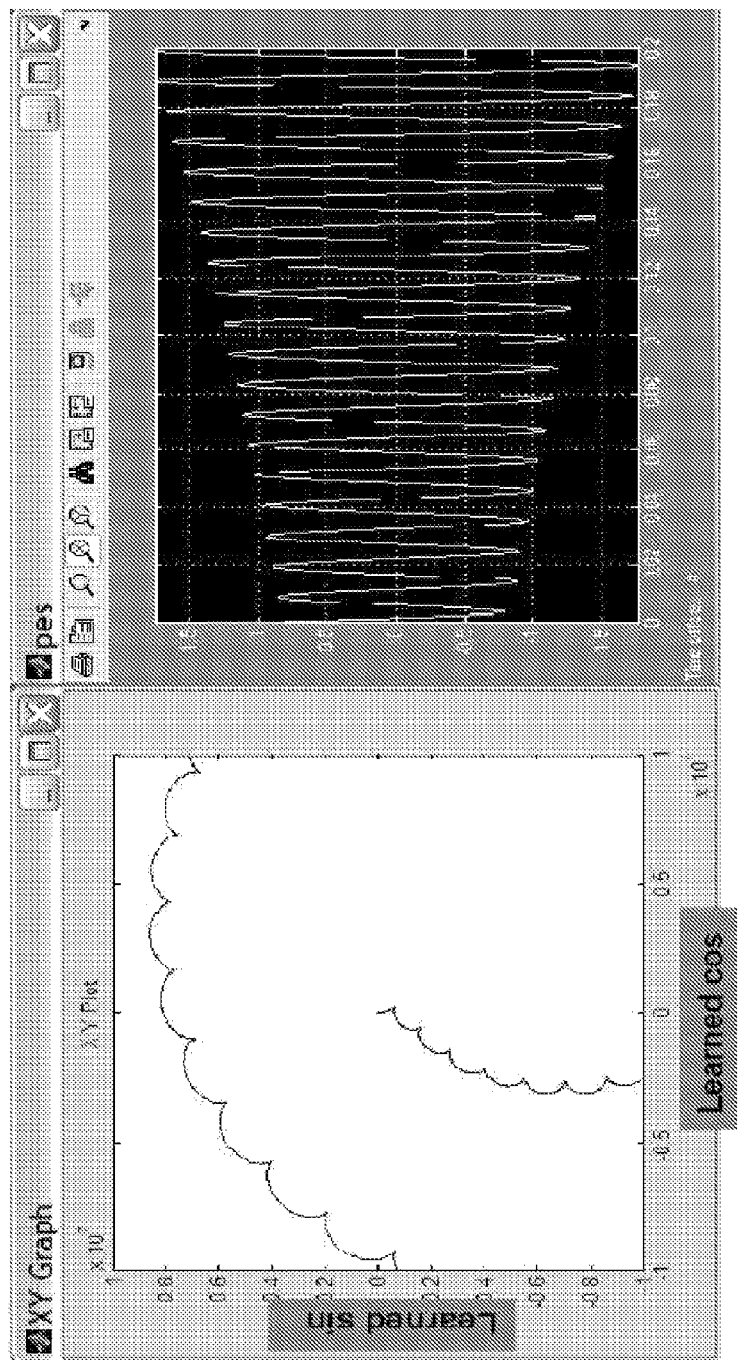
Figure 16:
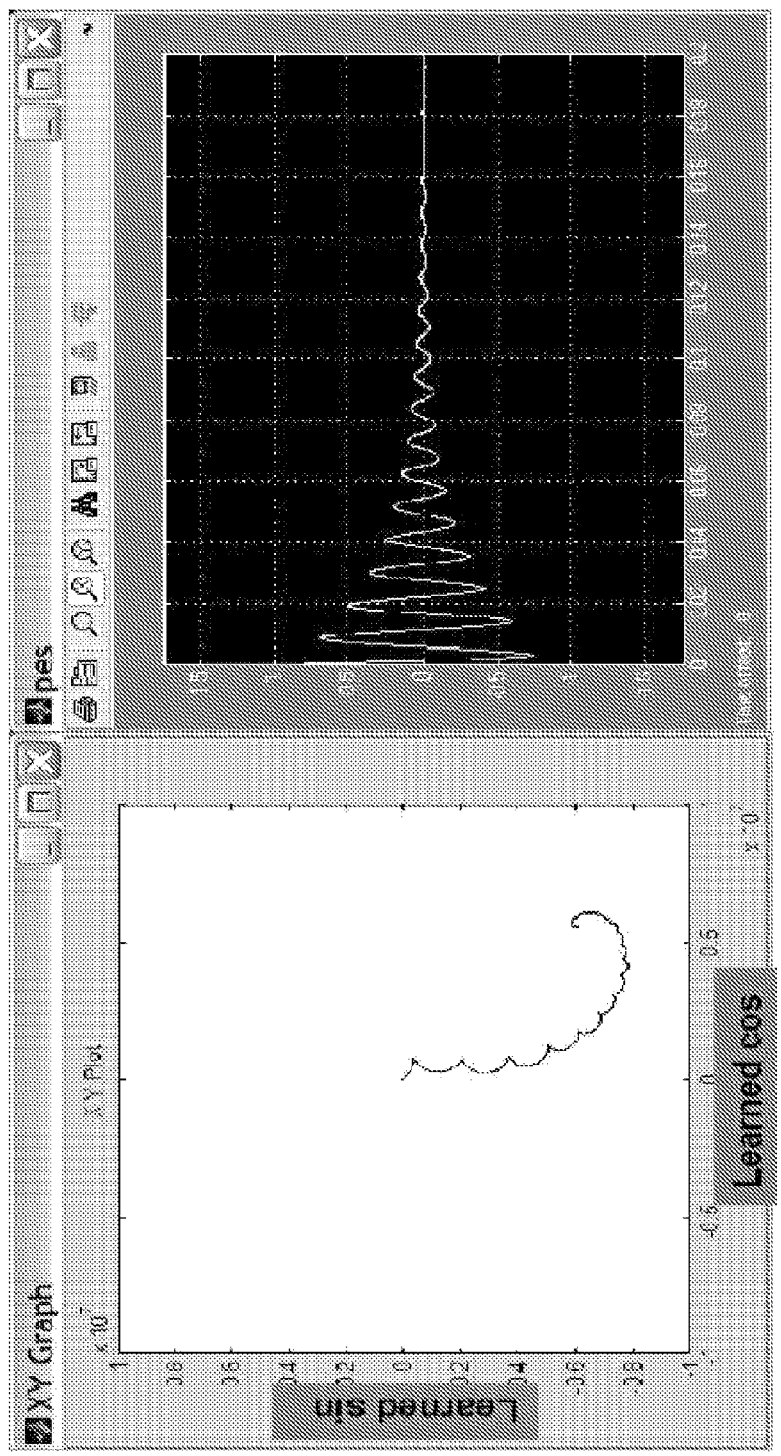
Figure 17:
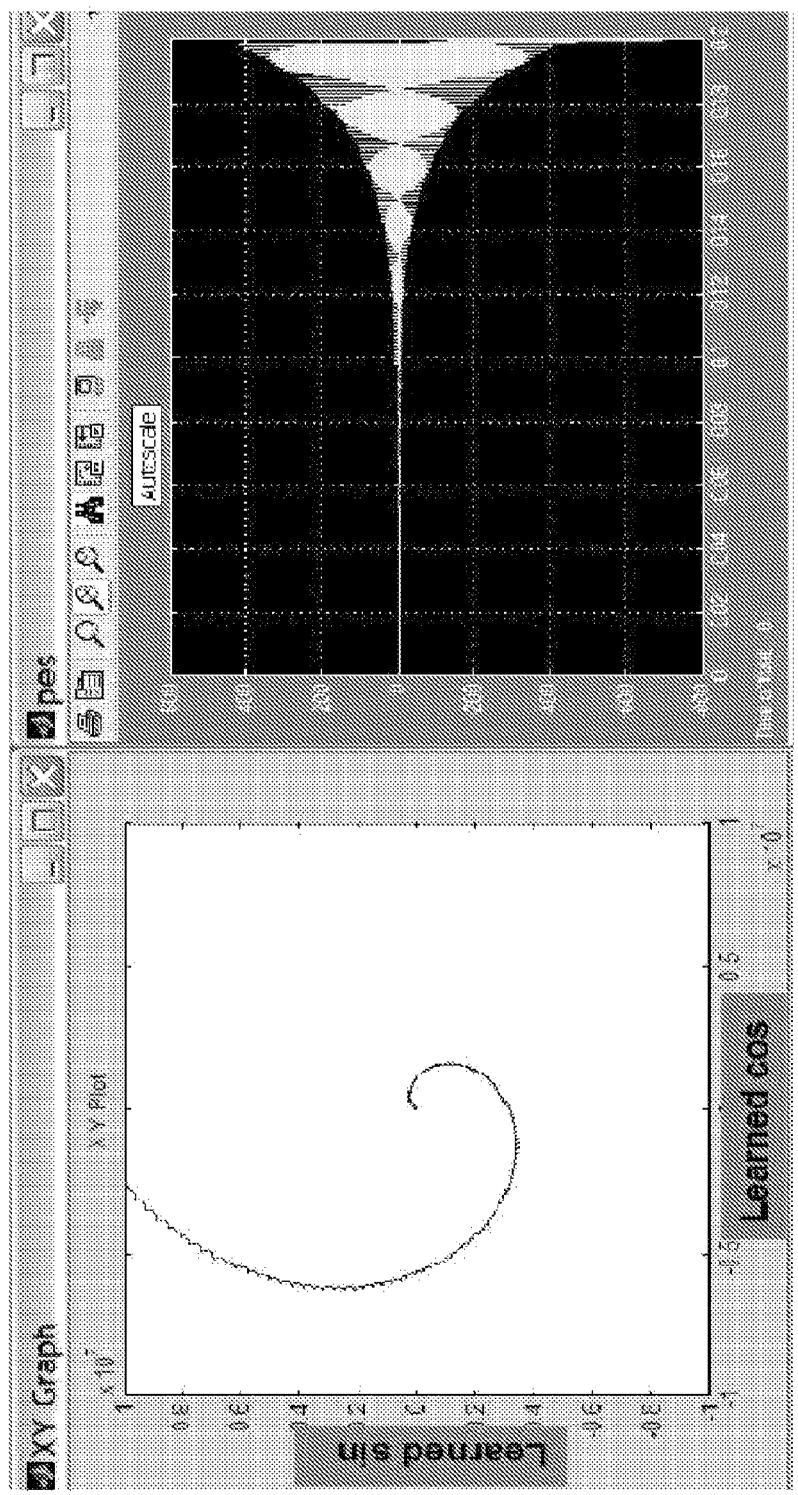
Figure 18:
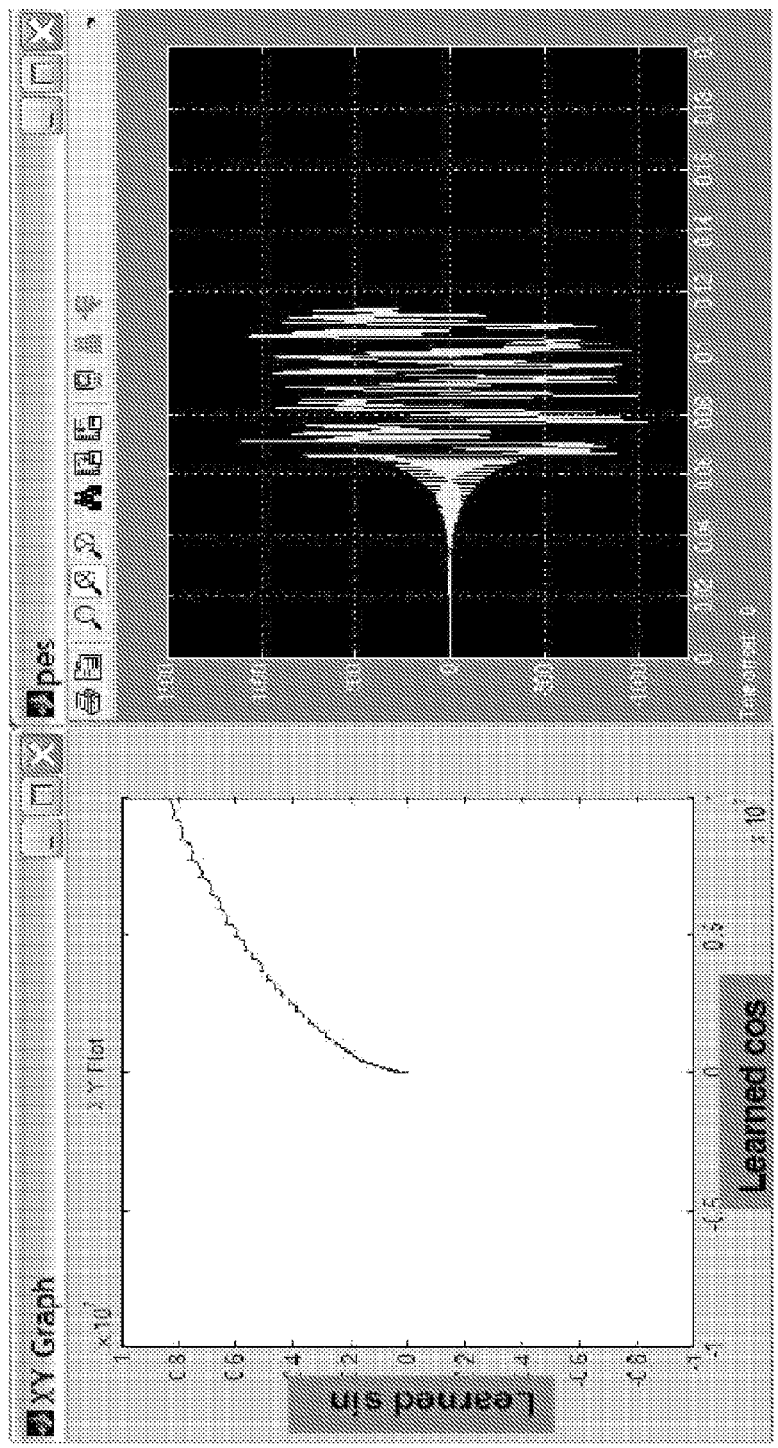
Figure 19:
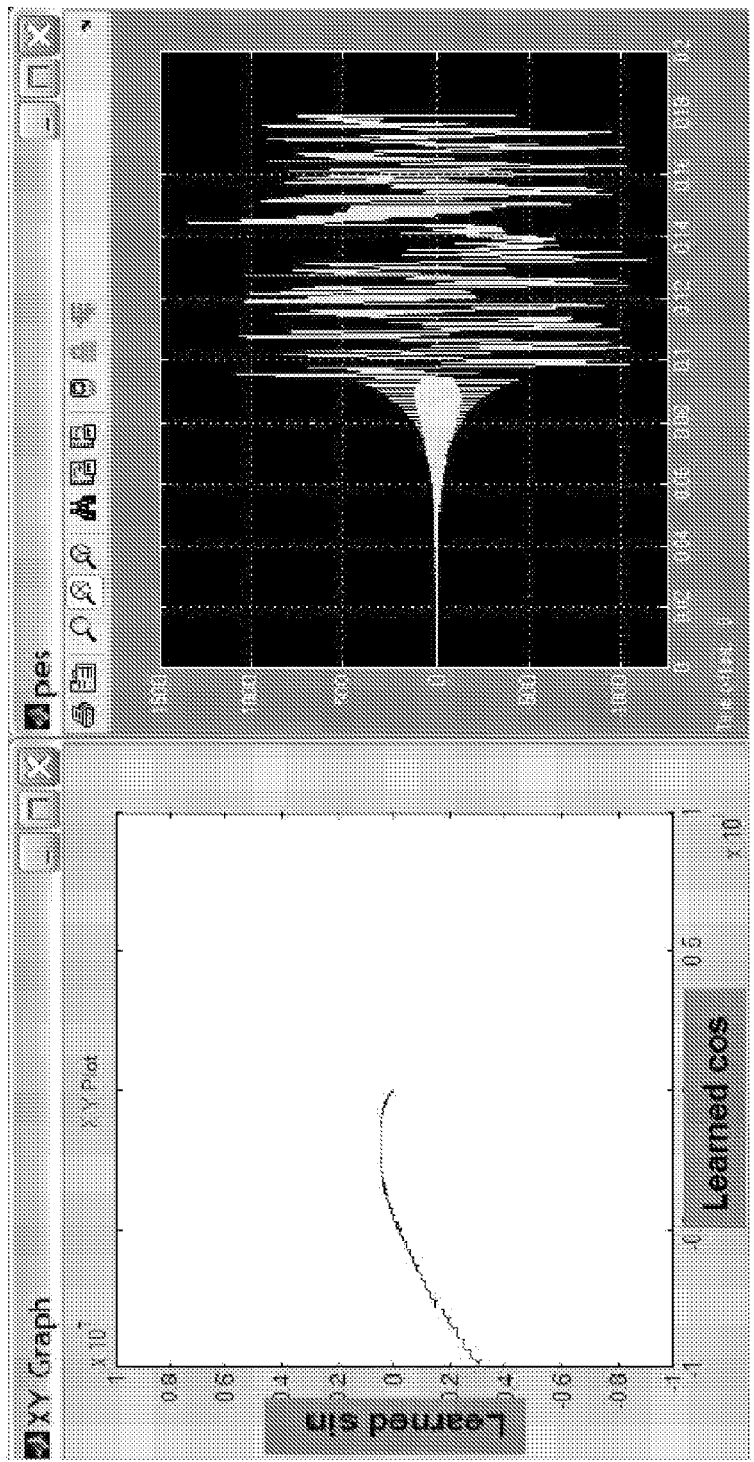
Figure 20:
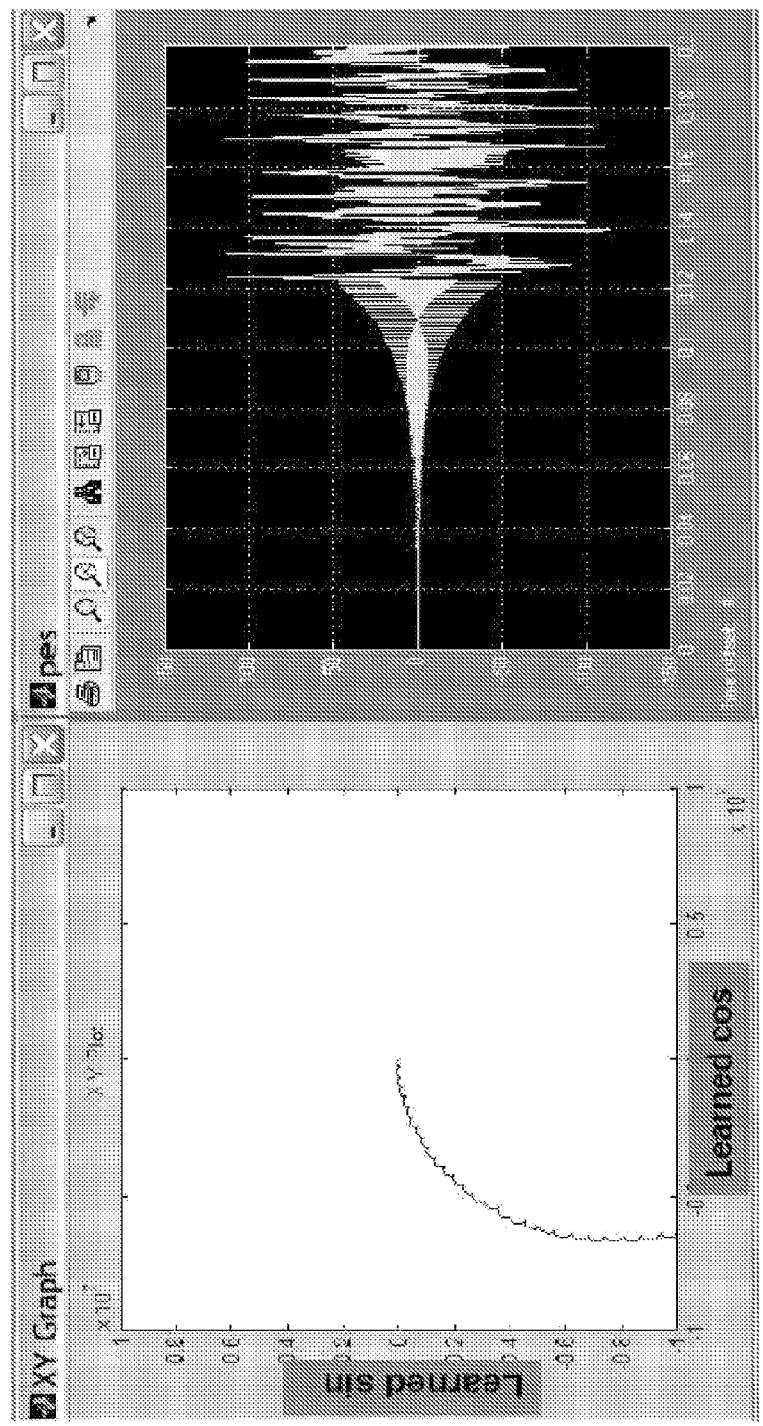
Figure 21:
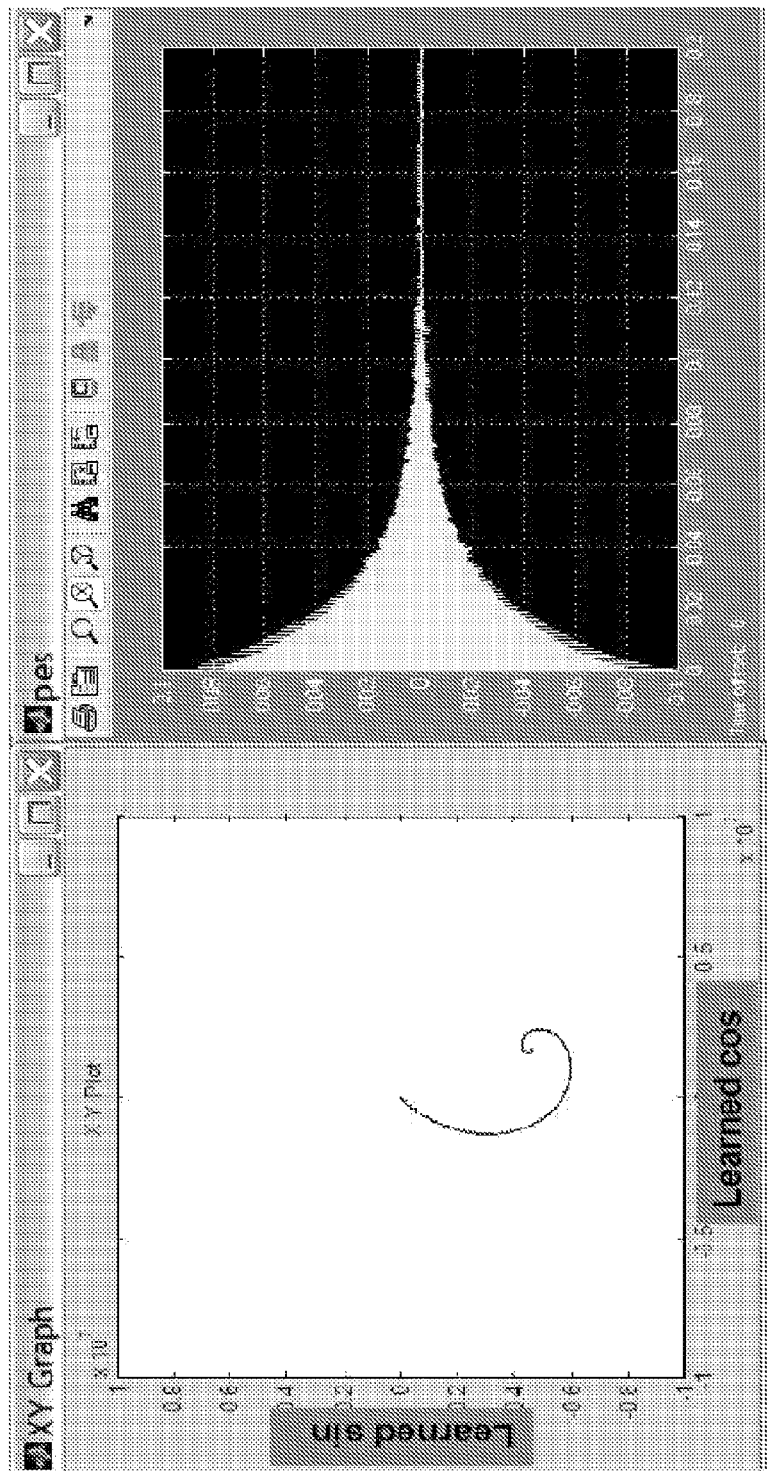
Figure 22:
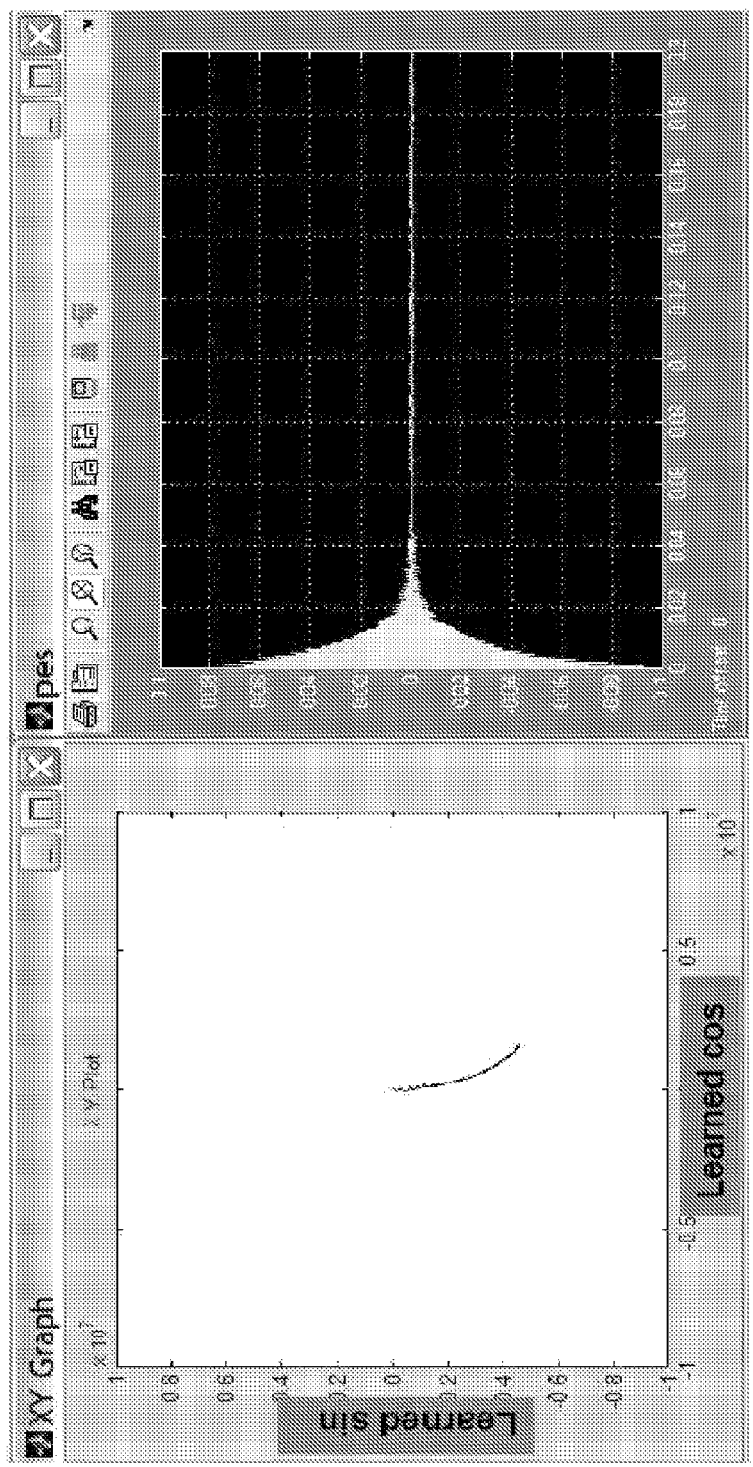
Figure 23:
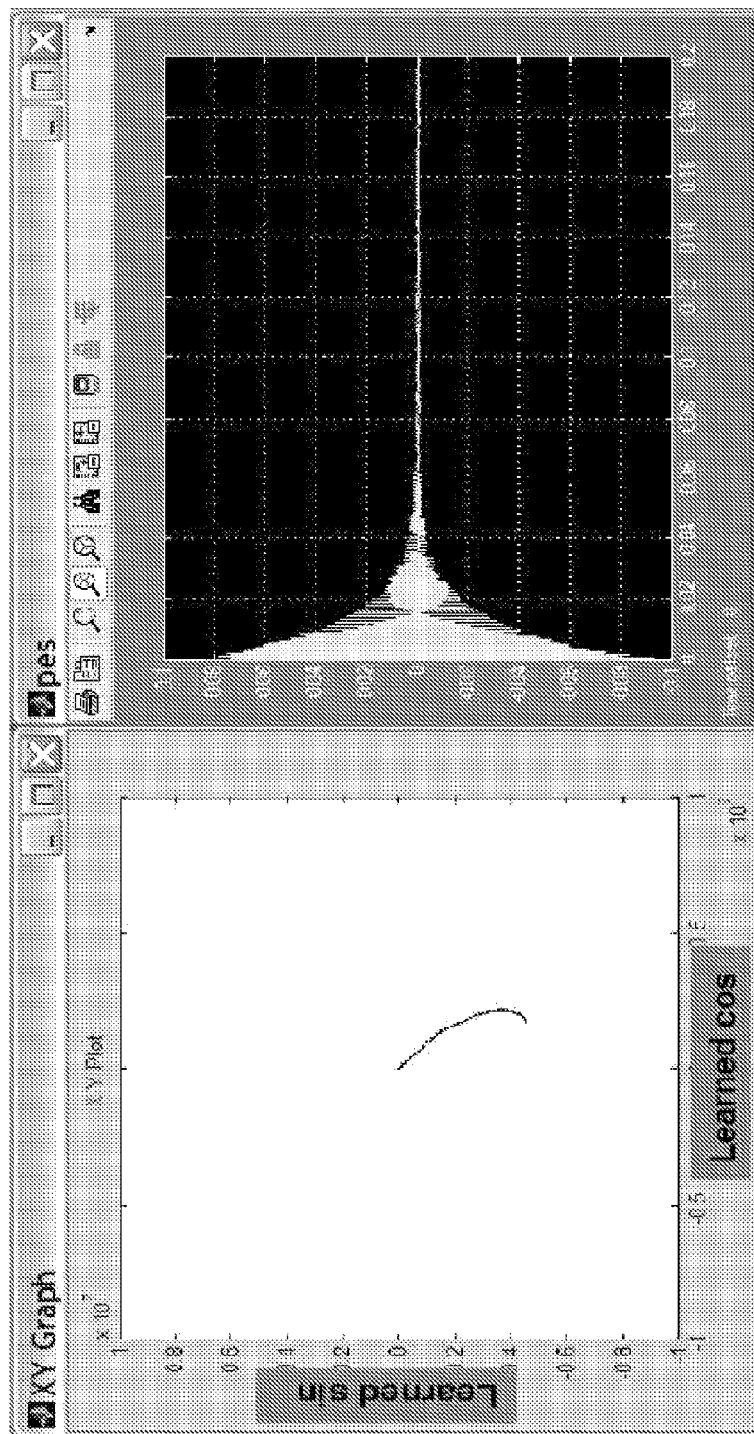
Figure 24:
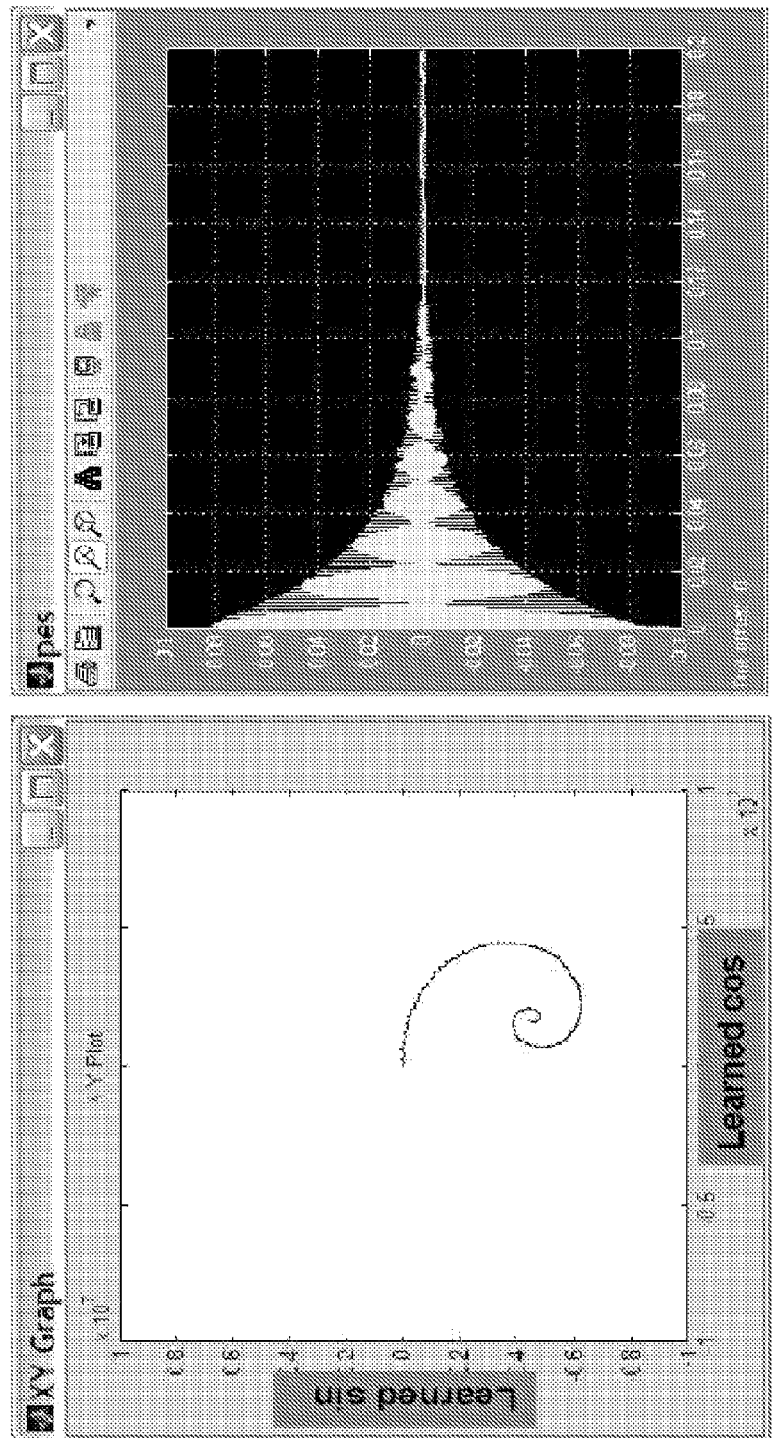

Processing module 63 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. Memory module 65 may take the form of a single memory device or a plurality of memory devices. Such a memory device may be a read-only memory, random access memory, volatile memory, non-volatile memory, static memory, dynamic memory, flash memory, cache memory, and/or any device that stores digital information. Note that when the Disk controller 52 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. Processing module 63 stores and executes operational instructions corresponding to at least some of the steps and/or functions illustrated with reference to FIGS. 10 and 11.

Disk controller 52 may support RRO cancellation on high spindle frequency that addresses when the servo system previously became unstable as Feed-Forward techniques were applied.

Embodiments of the present invention significantly reduce the number and complexity of processing operations to be performed. This is done by receiving the learned run out or vector A to be rotated by phase q. This phase q may be limited to a π/4 resolution. Sine function values and cosine function values based on q are selected from a group of values comprising −1, 0, and +1. The sine function values and cosine function values selected may then be applied to the learned run out or vector A to rotate the vector A by phase q. Because the sine and cosine values are limited to −1, 0 and +1 many multiplication processing operations are eliminated. This greatly simplifies the processing requirements associated with phase rotating of this learned run out as described below and with reference to equations 1, 2A and 2B.

$$A = Me^{jp}, B = 1.0\ e^{jq}$$

where q=0, pi/4, pi/2, 3pi/4, pi, 5pi/4 6pi/4, and 7pi/4

Figure 4:
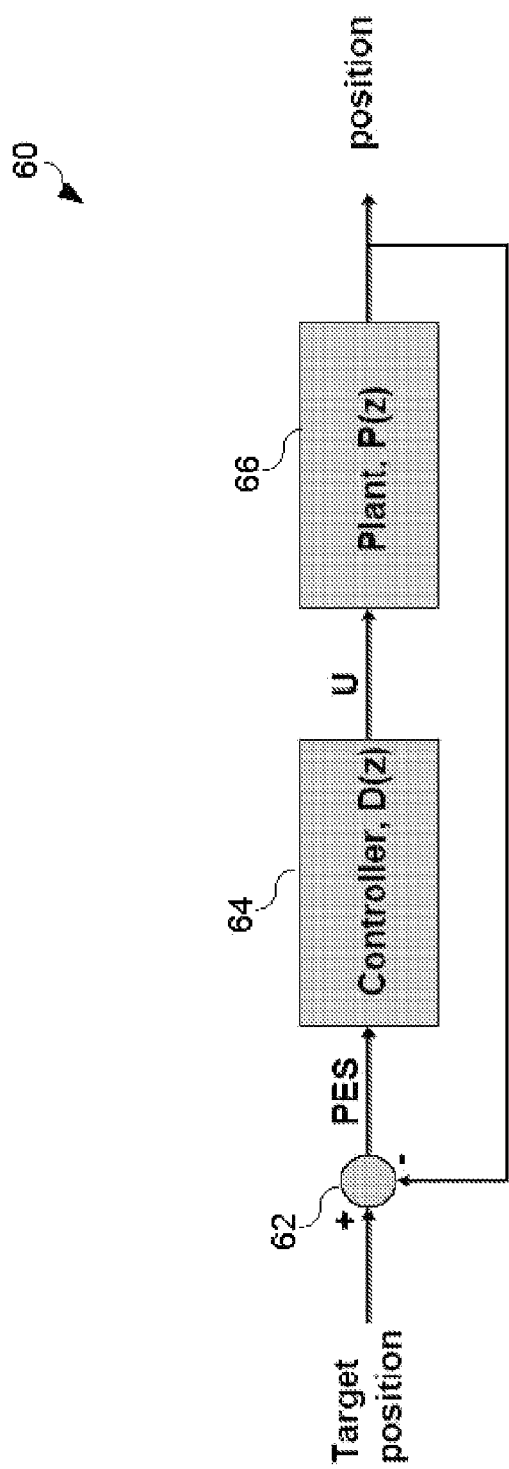
FIG. 4 provides a functional diagram of a prior art spindle frequency run-out cancellation module.

FIG. 4 provides a functional diagram of a prior art spindle frequency run-out cancellation module. Servo Loop 60 receives a target position which is compared (summed) with an expected position which are subtracted using Summation Model 62 to produce a position error signal. Controller 64 is used to produce a control effort which may be applied by actuator 66 in order to properly position the RW head.

Figure 5:
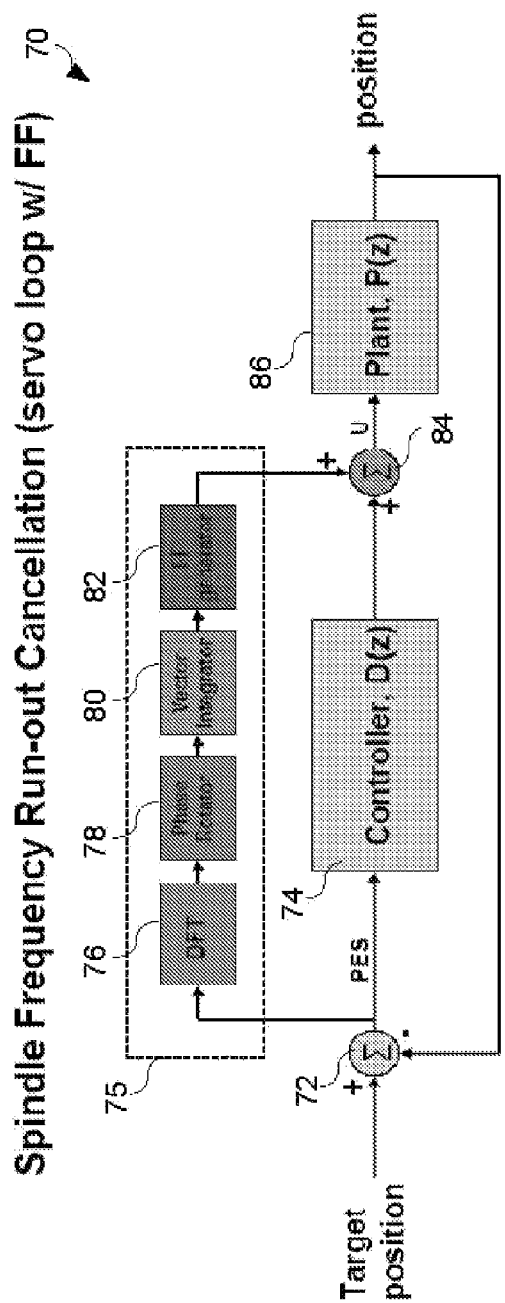
FIG. 5 provides a functional diagram of a spindle frequency run-out cancellation module with feed forward in accordance with an embodiment of the present invention.

FIG. 5 provides a functional diagram of a spindle frequency run-out cancellation module with feed forward (servo loop 70) in accordance with an embodiment of the present invention. Servo Loop 70 has the ability to feed forward in accordance with embodiments of the present invention. Here a target position and expected position are used to generate a position error signal (PES) with Summation Module 72. Controller 74 will generate an input to a control effort. Additionally, a feed-forward loop that includes DFT 76, Phase Rotator 78, Vector Integrator 80, and feed-Forward Generator 82 will supply a second input to Summation Module 84 to produce the control effort which may be applied by actuator 86 in order to produce the desired position. In order to rotate a Vector A by a Phase Q, the result should be given by A*B given the magnitude of B being 1.0 as discussed with reference to equations 1, 2A and 2B.

Figures 6A, 6B:
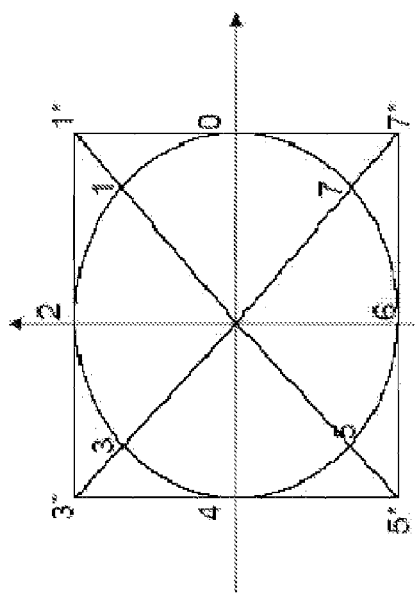
FIG. 6 provides a table in accordance with an embodiment of the present invention.

FIG. 6A provides a table in accordance with an embodiment of the present invention. This table shows how cosine and sine function values associated with a Π/4 resolution may correspond to selected values of −1, 0 and +1. This is again graphically illustrated in the illustration provided in FIG. 6B. For those points corresponding to a non ordinate not lined on the X or Y axes as shown an additional gain of one corresponding to the square root of two is realized.

Figure 7:
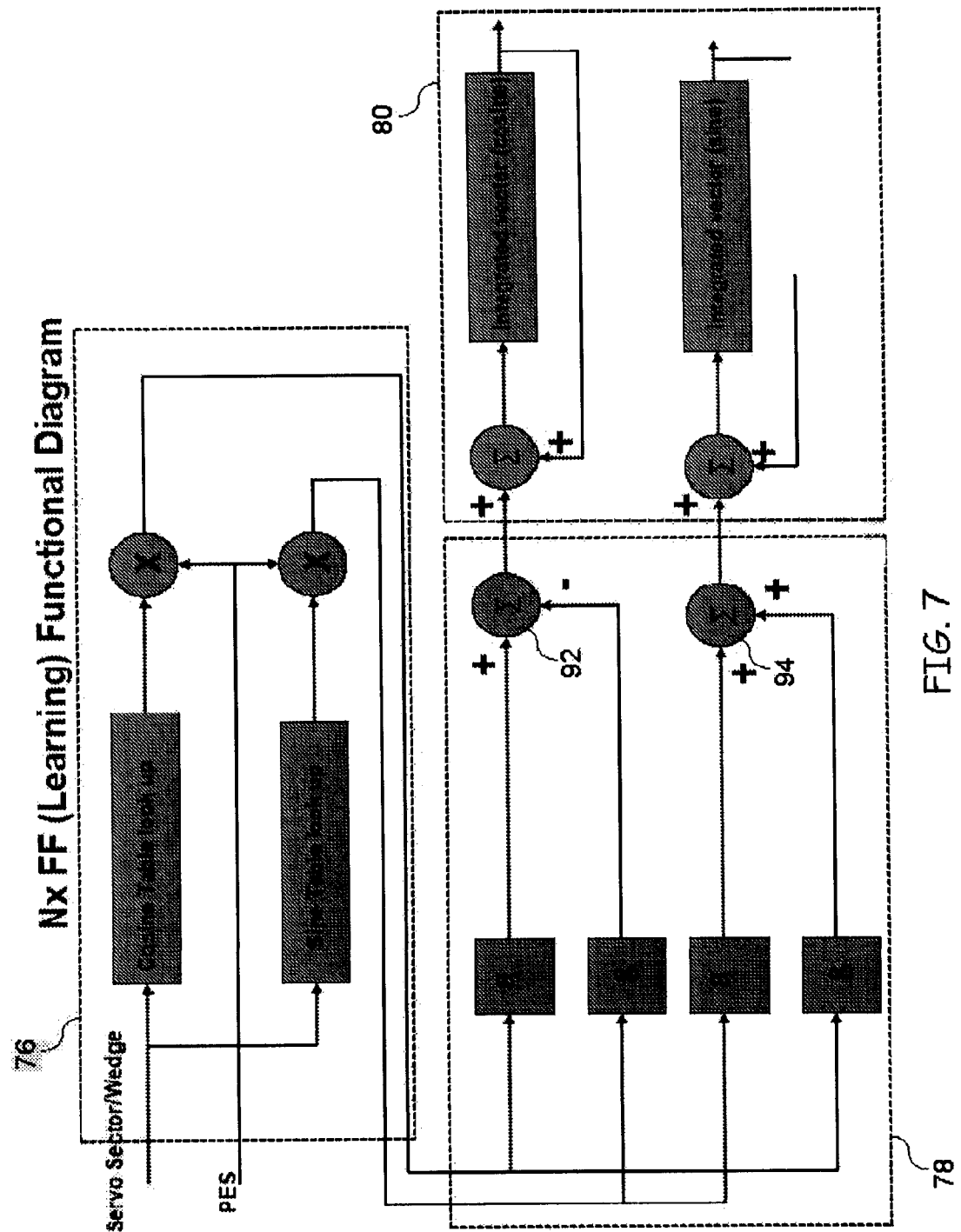
FIG. 7 provides an NxFF learning functional diagram in accordance with an embodiment of the present invention.
Figure 8:
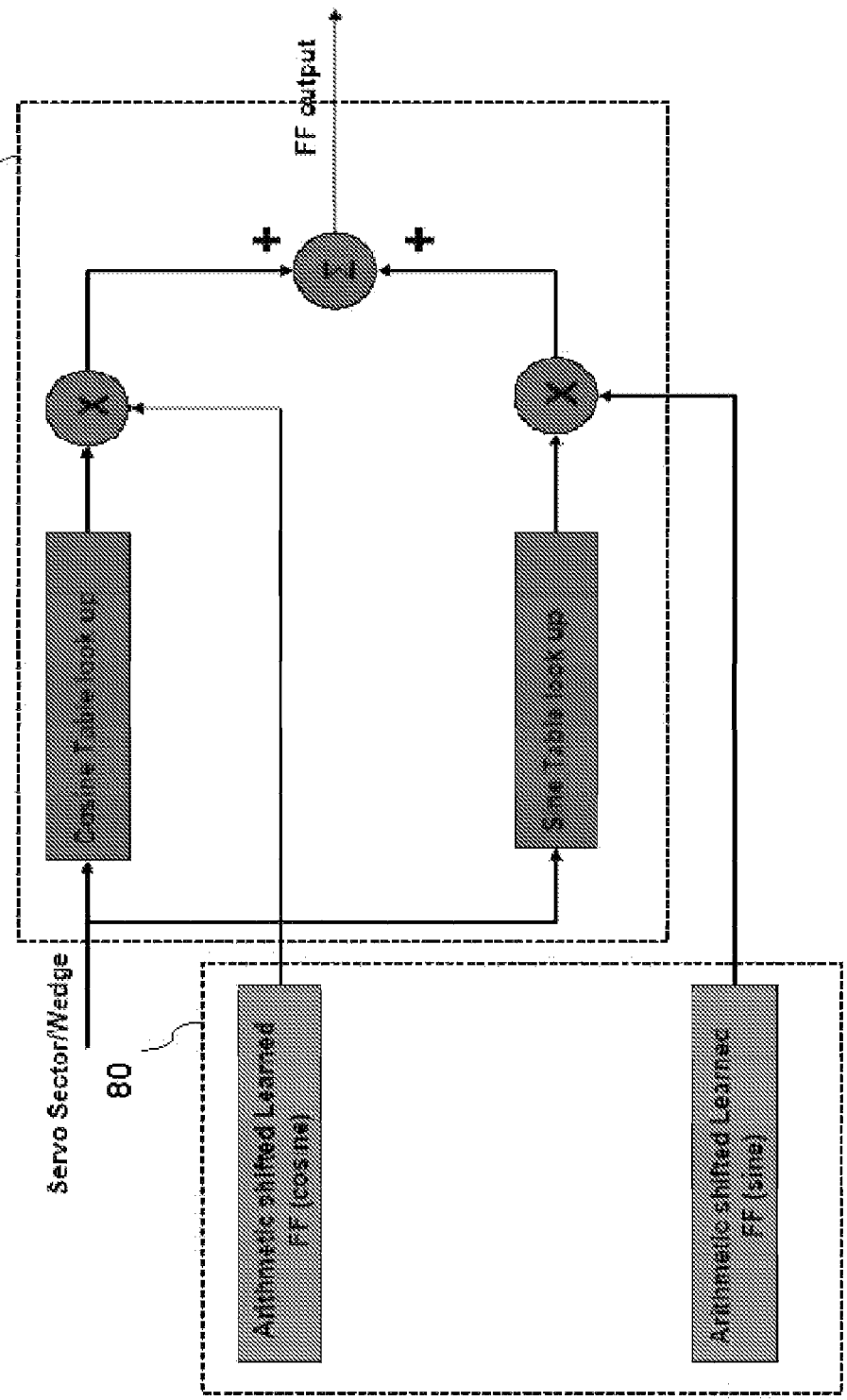
FIG. 8 provides an NxFF functional diagram in accordance with an embodiment of the present invention.
Figure 9:
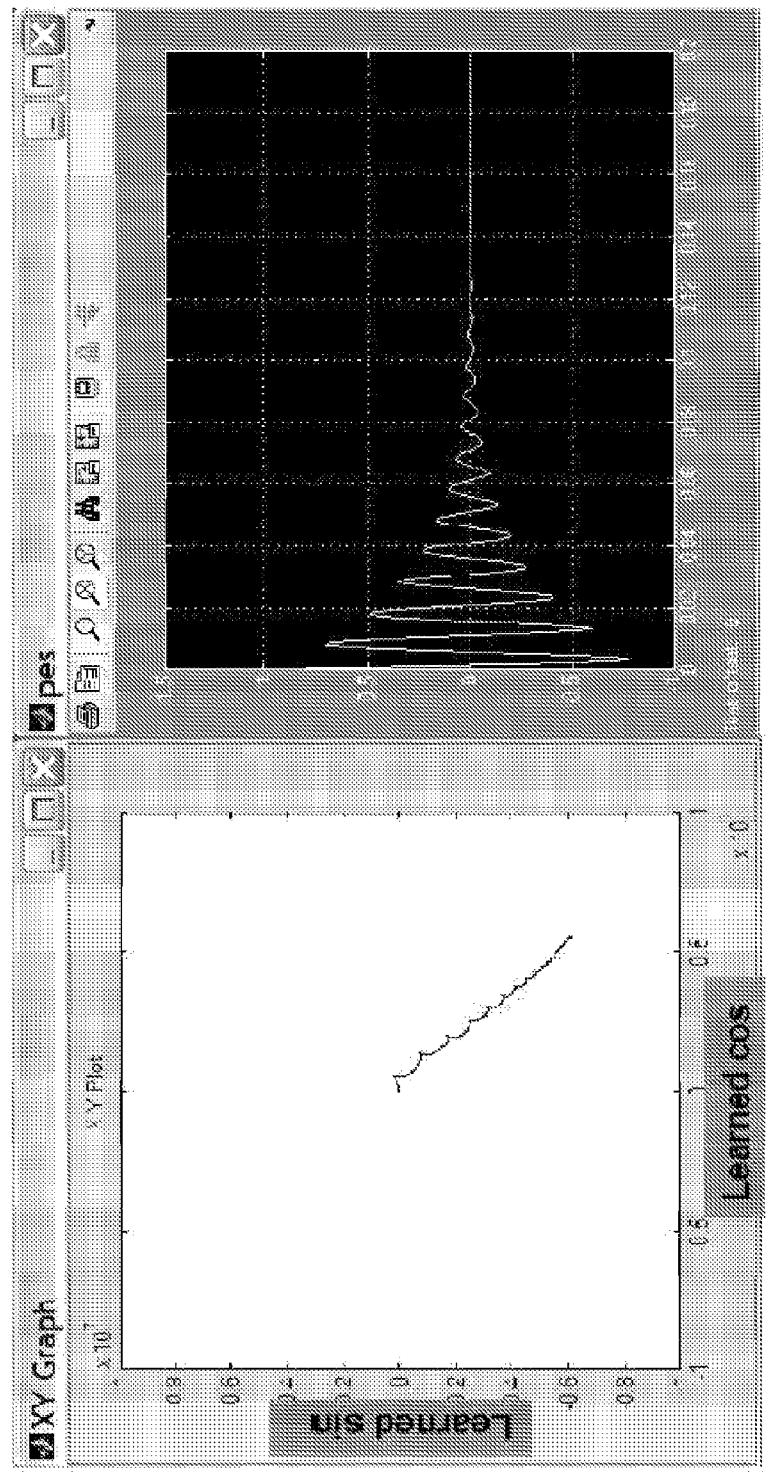
FIGS. 9-24 provide simulation basis and simulation results associated with embodiments of the present invention.

FIG. 7 provides an NxFF learning functional diagram within the feed forward loop in further detail in accordance with an embodiment of the present invention. FIG. 8 provides an NxFF functional diagram within the feed forward loop in further detail in accordance with an embodiment of the present invention. Here appropriate values for α and β are selected and applied to the sine and cosine values associated with the vector or learned run out to be rotated. The present invention greatly simplifies the hardware and computational requirements by limiting the values of α and β to −1, 0 and +1 in order to eliminate many multiplication operations. Therefore the sine and cosine functions associated with the learned run out may be looked up and then summed using summing modules 92 and 94 in order to produce outputs corresponding to equations 2A and 2B. As shown here the real part results is provided as the output real part of equation 2A is provided as the output of summation module 92 and the output of summation module 94 corresponds to equation 2B. When compared to prior techniques which may have rotated the learned output by an arbitrary angle phase Q the embodiments of the present invention greatly simplify the multiplication operations needed as well as the memory requirements associated with storing the sine and cosine values for any arbitrary value. The output of phase rotator 78 is then provided to vector integrator 80 which takes the outputs corresponding to equations 2A and 2B to produce integrated vector cosine and integrated vector sine functions that may be provided to feed forward generator 82 shown in FIG. 5. Feed forward integrator takes the arithmetic shifted learned feed forward cosine and sine values and produces a feed forward output which is a second control signal which may be combined as shown in FIG. 5 with the output of the controller 74 that produced a first control signal in order to produce a combined or modified control signal in a much less mathematically operation intensive manner.

FIGS. 9-24 provides simulation basis and simulation results associated with embodiments of the present invention.

Figure 25:
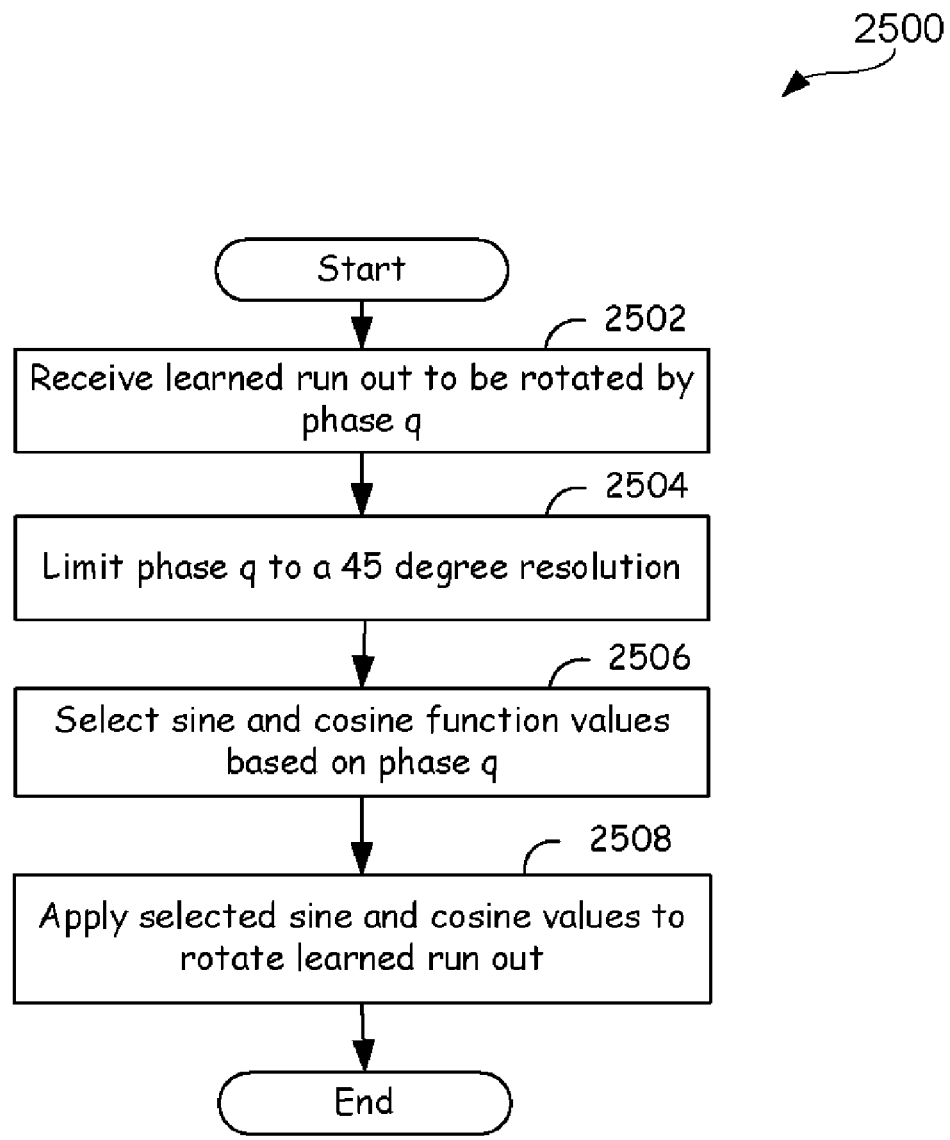
FIG. 25 is a diagram illustrating an embodiment of a method for performing phase rotation.

FIG. 25 is a diagram illustrating an embodiment of a method 2500 for performing phase rotation. The method 2500 begins by receiving information corresponding to a learned run out (e.g., a vector A as described elsewhere herein) that is to be rotated by a phase 'q', as shown in step 2502. Then, in step 2504, the method 2500 continues by limiting the phase 'q' to a predetermined resolution, which may be limited to a 45 degree resolution in some embodiments.

Once this is completed, the method 2500 continues by selecting sine and cosine function values based on the phase of 'q', as shown in step 2506 (e.g., which can be limited to a finite group of values such as 1, 0, and +1 as described elsewhere herein and which can reduce processing requirements and complexity). Thereafter, the method 2500 operates by applying the selected sine and cosine values to rotate the phase of the learned run out as shown in step 2508.

In summary, embodiments of the present invention provide a system and method to phase rotate a learned run out or vector for a repeat run out (RRO) feed forward cancellation system. This may be implemented for example within a spindle frequency run out cancellation system of an HDD.

Embodiments of the present invention significantly reduce the number and complexity of processing operations to be performed. This is done by receiving the learned run out or vector A to be rotated by phase q. This phase q may be limited to a π/4 resolution. Sine function values and cosine function values based on q are selected from a group of values comprising −1, 0, and +1. The sine function values and cosine function values selected may then be applied to the learned run out or vector A to rotate the vector A by phase q. Because the sine and cosine values are limited to −1, 0 and +1 many multiplication processing operations are eliminated. This greatly simplifies the processing requirements associated with phase rotating of this learned run out.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Although the present invention is described in detail, it should be understood that various changes, substitutions, and alterations can be made hereto without departing from the spirit and scope of the invention as described by the appended claims.

What is claimed:

1. A method to phase rotate a learned run out (vector A) Repeat Run Out (RRO) Feed-Forward cancellation system, comprising:
   receiving the learned run out (vector A) to be rotated by phase q;
   limiting the phase q to a Π/4 resolution;
   selecting sine function values (α) and cosine function values (β) based on phase q, wherein α and β are selected from a group of values including −1, 0 and +1; and
   applying α and β to sine function values and cosine function values associated with vector A to rotate vector A by the phase q.

2. The method of claim 1, wherein the selected values of α and β correspond to the sine and cosine functions corresponding to 0, Π/4, Π/2, 3Π/4, 5Π/4, 3Π/2, and 7Π/4.

3. The method of claim 1, wherein the learned run out is used to generate a control signal to position a read/write (RW) head of a hard disk drive.

4. The method of claim 3, further comprising providing the control signal to an actuator coupled to the RW head to position the RW head over a data track of the hard disk drive in response to the control signal.

5. The method of claim 1, wherein RW head positioning error from a data track due to repeatable error is substantially removed from a position error signal (PES).

6. The method of claim 1, wherein firmware within a Hard Disk Drive (HDD) controller implements the steps of claim 1.

7. A Spindle Frequency Run-out Cancellation system comprising:
a first summing module operable to determine a position error signal (PES) from a measured read/write (RW) head position and a directed RW head position;
a controller operable to generate a first control signal from the PES;
a Feed Forward loop operable to generate a second control signal from the PES;
a second summing module operable to produce a combined control signal from the first control signal and the second control signal; and
an actuator operable to position a RW head over a data track based on the combined control signal.

8. The Spindle Frequency Run-out Cancellation system of claim 7, wherein the Feed Forward loop comprises:
a discrete Fourier transform (DFT) module operable to receive the PES and generate a learned run out;
a phase rotator operable to rotate the learned run out by a phase q, wherein the phase q is limited to a Π/4 resolution;
a vector integrator operable to produce integrated vector sine and cosine components; and
a Feed Forward generator operable to produce the second control signal from the integrated vector sine and cosine components.

9. The Spindle Frequency Run-out Cancellation system of claim 8, wherein the phase rotator:
selects sine function values (α) and cosine function values (β) based on the phase q, wherein α and β are selected from a group of values including −1, 0 and +1; and
applies α and β to sine function values and cosine function values associated with the learned run out to rotate the learned run out by the phase q.

10. The Spindle Frequency Run-out Cancellation system of claim 9, wherein the selected values of α and β correspond to sine and cosine functions corresponding to 0, Π/4, Π/2, 3Π/4 Π, 5Π/4, 3Π/2, and 7Π/4.

11. The Spindle Frequency Run-out Cancellation system of claim 8, wherein the combined control signal is used to position the RW head; and
the RW head is part of a hard disk drive.

12. The Spindle Frequency Run-out Cancellation system of claim 11, wherein RW head positioning error from the data track due to repeatable error is substantially removed from the PES.

13. The Spindle Frequency Run-out Cancellation system of claim 11, wherein repeatable error substantially removed from the PES has a frequency corresponding to a harmonic of a spindle frequency.

14. The Spindle Frequency Run-out Cancellation system of claim 8, wherein the measured RW head position is derived from servo information.

15. A hard disk drive controller operable to substantially remove repeatable positioning errors from a measured read/write (RW) head position and a directed RW head position comprising:
an interface module operable to couple the hard disk drive controller to a host computer system;
a processing module coupled to a memory module, wherein the processing module further includes a Spindle Frequency Run-out Cancellation system, that includes:
a first summing module operable to determine a position error signal (PES) from the measured read/write (RW) head position and the directed RW head position;
a controller operable to generate a first control signal from the PES;
a Feed Forward loop operable to generate a second control signal from the PES;
a second summing module operable to produce a combined control signal from the first control signal and the second control signal; and
an actuator operably coupled to the processing module to position the RW head over a data track based on the combined control signal.

16. The hard disk drive controller of claim 15, wherein the Feed Forward loop comprises:
a discrete Fourier transform (DFT) module operable to receive the PES and generate a learned run out;
a phase rotator operable to rotate the learned run out by a phase q, wherein the phase q is limited to a Π/4 resolution;
a vector integrator operable to produce integrated vector sine and cosine components; and
a Feed Forward generator operable to produce the second control signal from the integrated vector sine and cosine components.

17. The hard disk drive controller of claim 16, wherein the phase rotator:
selects sine function values (α) and cosine function values (β) based on the phase q, wherein α and β are selected from a group of values comprising −1, 0 and +1; and
applies α and β to sine function values and cosine function values associated with the learned run out to rotate the learned run out by the phase q.

18. The hard disk drive controller of claim 17, wherein selected values of α and β correspond to the sine and cosine functions corresponding to 0, Π/4, Π/2, 3Π/4, 5Π/4, 3Π/2, and 7Π/4.

19. The hard disk drive controller of claim 15, wherein combined control signal is used to position a RW head of a hard disk drive.

20. The hard disk drive controller of claim 15, wherein the repeatable error substantially removed from the PES has a frequency corresponding to a harmonic of a spindle frequency.

21. The hard disk drive controller of claim 15, wherein the measured RW head position is derived from servo information within a hard disk drive.

* * * * *

UNITED STATES PATENT AND TRADEMARK OFFICE
CERTIFICATE OF CORRECTION

| | | |
|---|---|---|
| PATENT NO. | : 7,433,148 B2 | Page 1 of 1 |
| APPLICATION NO. | : 11/695135 | |
| DATED | : October 7, 2008 | |
| INVENTOR(S) | : Richard Koonwai Wong | |

It is certified that error appears in the above-identified patent and that said Letters Patent is hereby corrected as shown below:

Column 7, line 8, in Claim 7: insert a --,-- after "system"

Column 8, line 9, in Claim 15: remove the "," after "system"

Signed and Sealed this

Twenty-eighth Day of April, 2009

JOHN DOLL
*Acting Director of the United States Patent and Trademark Office*